US012388857B1

(12) United States Patent
Cheng et al.

(10) Patent No.: US 12,388,857 B1
(45) Date of Patent: Aug. 12, 2025

(54) ADAPTIVE NETWORK THREAT DETECTION IN DISTRIBUTED AUTOMOTIVE EXECUTION ENVIRONMENTS OF CONNECTED VEHICLES

(71) Applicant: VicOne Corporation, Tokyo (JP)

(72) Inventors: Yi-Li Cheng, Taipei (TW); Chih-Kang Lu, Taipei (TW); Zhi-Wei Chen, Taipei (TW); Yi-Ting Chen, Taipei (TW)

(73) Assignee: VicOne Corporation, Tokyo (JP)

( * ) Notice: Subject to any disclaimer, the term of this patent is extended or adjusted under 35 U.S.C. 154(b) by 130 days.

(21) Appl. No.: 18/347,855

(22) Filed: Jul. 6, 2023

(51) Int. Cl.
*G06F 15/16* (2006.01)
*H04L 9/40* (2022.01)
*H04L 67/12* (2022.01)

(52) U.S. Cl.
CPC ...... *H04L 63/1425* (2013.01); *H04L 63/1416* (2013.01); *H04L 67/12* (2013.01)

(58) Field of Classification Search
CPC .. H04L 63/1425; H04L 63/1416; H04L 67/12
See application file for complete search history.

(56) References Cited

U.S. PATENT DOCUMENTS

2018/0205754 A1* 7/2018 North .................... H04L 63/145
2019/0379682 A1* 12/2019 Overby ................... H04L 12/40
2020/0274851 A1* 8/2020 Qiao ................... H04L 63/0263
2020/0389469 A1* 12/2020 Litichever ............. H04L 63/145

OTHER PUBLICATIONS

Yulia Gavrilova, “What is Anomaly Detection in Machine Learning?”, Serokell, Dec. 10, 2021, https://serokell.io/blog/anomaly-detection-in-machine-learning.
“Central Gateway (CGW) for commercial vehicles”, BOSCH, downloaded May 12, 2023, https://www.bosch-mobility.com/en/solutions/vehicle-computer/central-gateway-cv/.
“On-board diagnostics”, Wikipedia, downloaded May 12, 2023, https://en.wikipedia.org/wiki/On-board_diagnostics.
“Vehicle Signal Specification”, downloaded Feb. 8, 2023, https://covesa.github.io/vehicle_signal_specification/.

* cited by examiner

*Primary Examiner* — Normin Abedin
(74) *Attorney, Agent, or Firm* — Beyer Law Group LLP

(57) ABSTRACT

An intrusion detection and prevention system (IDPS) has detection probes and detection hubs that are deployed onboard a connected vehicle and a detection correlation backend that is deployed on the cloud. A detection probe receives raw packets of network traffic of a communication network of the connected vehicle. The detection probe filters the raw packets in accordance with packet filter rule entries to generate packets of interest. The detection probe scans the packets of interest for data indicative of network threats and outputs corresponding unfiltered detection logs. The detection probe filters the unfiltered detection logs in accordance with detection filter rule entries to generate detection logs of interest. A detection hub aggregates detection logs of interest from one or more detection probes to generate aggregated detection logs. A detection correlation backend evaluates the aggregated detection logs to detect network threats.

17 Claims, 11 Drawing Sheets

T[0-5]: Timestamp to receiver/subscriber side
d[1-3]: Transit delay between sender/publisher and receiver/subscriber
Δ : Constant time offset between sender/publisher and receiver/subscriber

ADAPTIVE NETWORK THREAT DETECTION IN DISTRIBUTED AUTOMOTIVE EXECUTION ENVIRONMENTS OF CONNECTED VEHICLES

TECHNICAL FIELD

The present disclosure is directed to automotive cybersecurity.

BACKGROUND

A connected vehicle can communicate with devices or systems that are external to the vehicle. Most new vehicles on the market today are connected in that they have modules that can perform external communication by wireless or wired connection. A connected vehicle may also have sensors for receiving sensed data of its physical environment.

Connected vehicles typically have a plurality of electronic control units (ECUs) that perform various functions. For example, a connected vehicle may have an ECU for the head unit, an ECU for engine management, an ECU for a telematic control unit, etc. ECUs are computers with software and hardware components. More particularly, an ECU has a processor that executes software components, such as an operating system, application programs, and/or firmware. Due to the complexity of ECUs, an original equipment manufacturer (OEM) of a connected vehicle sources one or more ECUs and/or software components thereof from third-party suppliers.

A connected vehicle is susceptible to network threats, which are cyberattacks on a communication network of the connected vehicle. Intrusion detection and prevention systems (IDPSs) have been employed as a security measure against network threats in traditional information technology (IT) networks. Generally, it is relatively easy to deploy an IDPS everywhere in an IT network including on personal computers, servers in the cloud, routers, proxies, virtual machines, etc., which typically run widely-used operating systems and have sufficient hardware (e.g., processor, storage) resources. In contrast, essential components of a connected vehicle, such as hardware resources, operating systems, and network topologies, can vary depending on the model and the OEM of the connected vehicle. Furthermore, it is relatively difficult to effectively operate and deploy a conventional IDPS in a connected vehicle due to limited hardware resources, restricted network accessibility, and highly customized operating systems of a typical connected vehicle.

BRIEF SUMMARY

In one embodiment, an intrusion detection and prevention system (IDPS) has detection probes and detection hubs that are deployed onboard a connected vehicle and a detection correlation backend that is deployed on the cloud. A detection probe receives raw packets of network traffic of a communication network of the connected vehicle. The detection probe filters the raw packets in accordance with packet filter rule entries to generate packets of interest. The packet filter rule entries describe selected packets to be filtered out from the raw packets. The detection probe scans the packets of interest for data indicative of network threats and outputs corresponding unfiltered detection logs. The detection probe filters the unfiltered detection logs in accordance with detection filter rule entries to generate detection logs of interest. The detection filter rule entries describe detection logs to be filtered out from the unfiltered detection logs. A detection hub aggregates detection logs of interest from one or more detection probes to generate aggregated detection logs. A detection correlation backend evaluates the aggregated detection logs to detect network threats.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Connected vehicles provide very different execution environments compared to traditional IT networks. In a connected vehicle, an IDPS needs to run with minimal computing power and network bandwidth in various execution environments while processing a large number of packets, which may be normal or malicious. An IDPS in a connected vehicle thus greatly benefits from a customizable, scalable, and adaptive mechanism to throttle packet filtering and to aggregate detection logs, either locally or on demand.

A conventional IDPS usually works independently without having to know sibling IDPS components. This is usually not an issue in IT networks because an IDPS can be deployed in multiple execution environments, with or without time synchronized with a common standard time, such as Coordinated Universal Time (UTC). In contrast, due to the topology of in-vehicle communication networks, multiple IDPS components in a connected vehicle can generate duplicate detections of the same events. Without synchronizing the clocks of different IDPS components, event detections in the connected vehicle cannot be sorted in temporal order, making it difficult to identify and aggregate duplicate event detections (e.g., those occurring within a short time range) to be identified. Unconditionally uploading duplicate event detections and event detections with arbitrary timestamp skews from the connected vehicle to a backend service on the cloud for network threat detection presents a huge burden on network bandwidth and the backend service.

Figure 1:
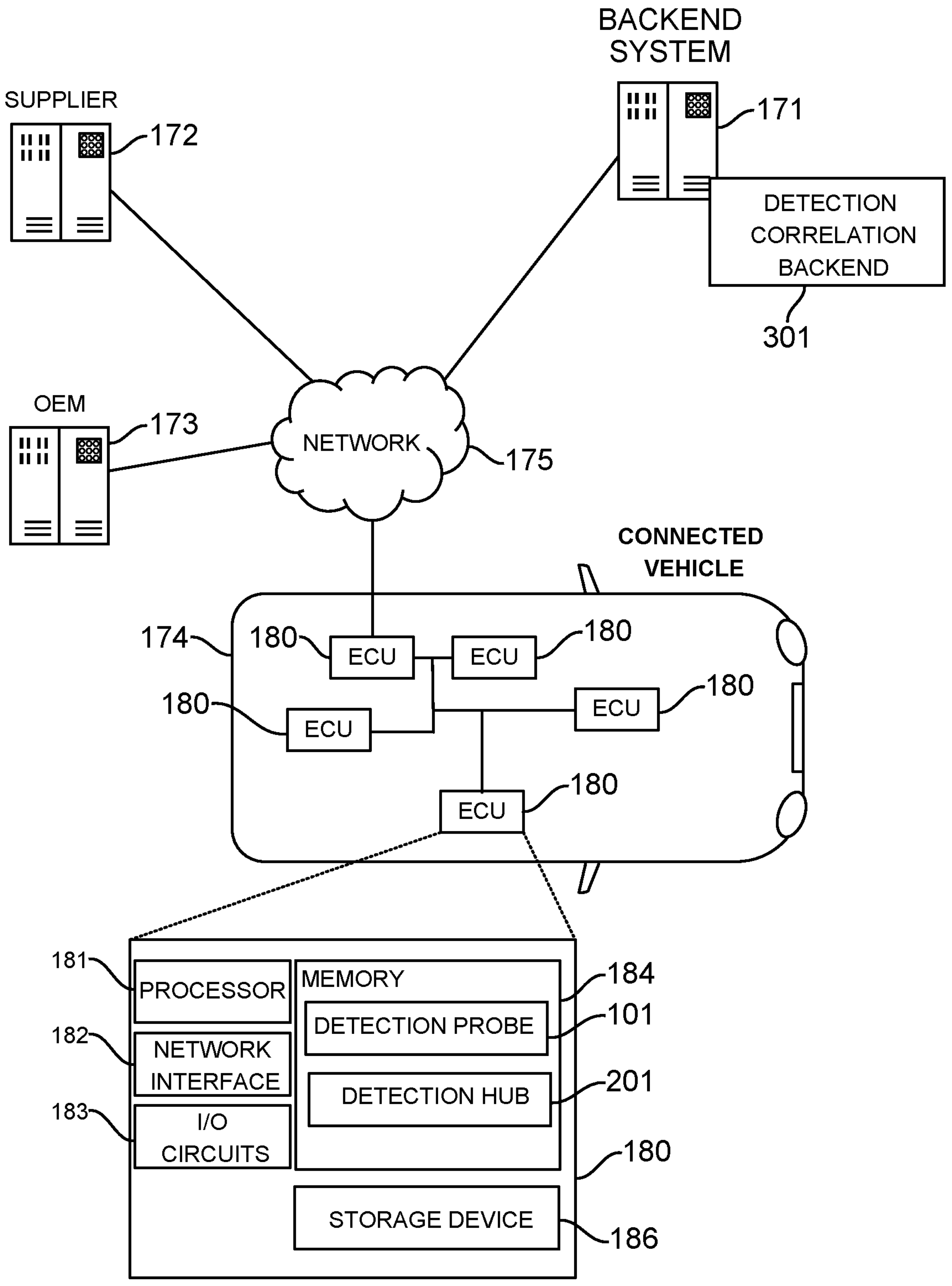
FIG. 1 shows a block diagram of a connected vehicle in accordance with an embodiment of the present invention.

Referring now to FIG. 1, there is shown a block diagram of a connected vehicle 174 in accordance with an embodiment of the present invention. FIG. 1 shows a single connected vehicle 174, a single third-party supplier 172, and a single OEM 173 for illustration purposes only. As can be appreciated, there are many OEMs that manufacture connected vehicles that have modules sourced from many, different suppliers.

The vehicle 174 has a plurality of ECUs 180. An ECU 180 may be for a safety system, body system, chassis system, power system, telematic control unit (TCU), Global Navigation Satellite System (GNSS), vehicle-to-everything (V2X) interfaces, remote keyless entry, etc. One or more of the ECUs 180 and associated software components may be provided by the supplier 172 to the OEM 173, which is the manufacturer of the vehicle 174. The supplier 172 may provide firmware, source code, and/or other software components by removable storage media (e.g., Universal Serial Bus (USB) flash storage) or over a communication network 175, which includes the public Internet in this example. Each of the OEM 173 and the supplier 172 is depicted as a computer system to indicate that the OEM 173 and the supplier 172 may send and receive software components and/or communicate with the vehicle 174 over the communication network 175.

An ECU 180 is a computer comprising a processor 181, a memory 184, one or more network interfaces 182 for connecting to an in-vehicle (i.e., internal to the vehicle 174) communication network and/or external communication network, and one or more input/output (I/O) circuits 183. An I/O circuit 183 may be a data acquisition and control circuit, a sensor interface, or other circuit for receiving external data, such as communications from other connected vehicles, sensed data of the environment outside the vehicle 174, etc. The memory 184 may be non-volatile memory (e.g., non-volatile random access memory (NVRAM)) or volatile memory (e.g., dynamic random access memory (DRAM)). Instructions of one or more onboard (i.e., in the vehicle 174) cybersecurity modules and other software components of the ECU 180 may be stored in the memory 184 for execution by the processor 181. In one embodiment, the memory 184 stores one or more detection probes 101 and one or more detection hubs 201.

An ECU 180 may be connected to other ECUs 180 over an in-vehicle communication network, such an Ethernet network, a Controller Area Network (CAN) bus, a Modbus network, etc. An ECU 180 may communicate with external devices outside of the vehicle 174 by way of a V2X network or a suitable vehicle ad-hoc network (VANET).

A backend system 171 may comprise one or more computer systems for supporting cybersecurity operations in one or more connected vehicles. The backend system 171 is on the cloud in that it is external to the vehicle 174 and communicates with the vehicle 174 over the communication network 175, which in this example includes the public Internet. The backend system 171 may serve as a vehicle security operations center for the vehicle 174. In one embodiment, the backend system 171 hosts a detection correlation backend 301. The detection correlation backend 301 comprises instructions stored in a memory of the backend system 171 that, when executed by at least one processor of the backend system 171, cause the backend system 171 to operate as explained herein.

As will be more apparent below, embodiments of the present invention provide an adaptive framework for deploying software components of an IDPS in heterogeneous multiple execution environments of a connected vehicle, with the framework allowing for ease of resource usage throttling, cooperative information exchange, and management. An "execution environment" indicates an operating system running in either a physical device or a virtual machine where software components can run with the required hardware components or software libraries.

In one embodiment, the adaptive framework supports an IDPS comprising a plurality of distributed nodes, with a node being a detection probe 101, a detection hub 201, or a detection correlation backend 301. The relationship between the detection probes 101, detection hubs 201, and correlation backend 301 may be defined as a hierarchy of nodes. A detection probe 101 has no child nodes and has only one parent node, which is either a detection hub 201 or a detection correlation backend 301. A detection correlation backend 301 has no parent node and can have multiple child nodes, which are detection probes 101 and/or detection hubs 201. A detection hub 201 can have multiple child nodes (which are detection probes 101 and/or detection hubs 201) and has only one parent node (which is either a detection hub 201 or a detection correlation backend 301).

Figure 2:
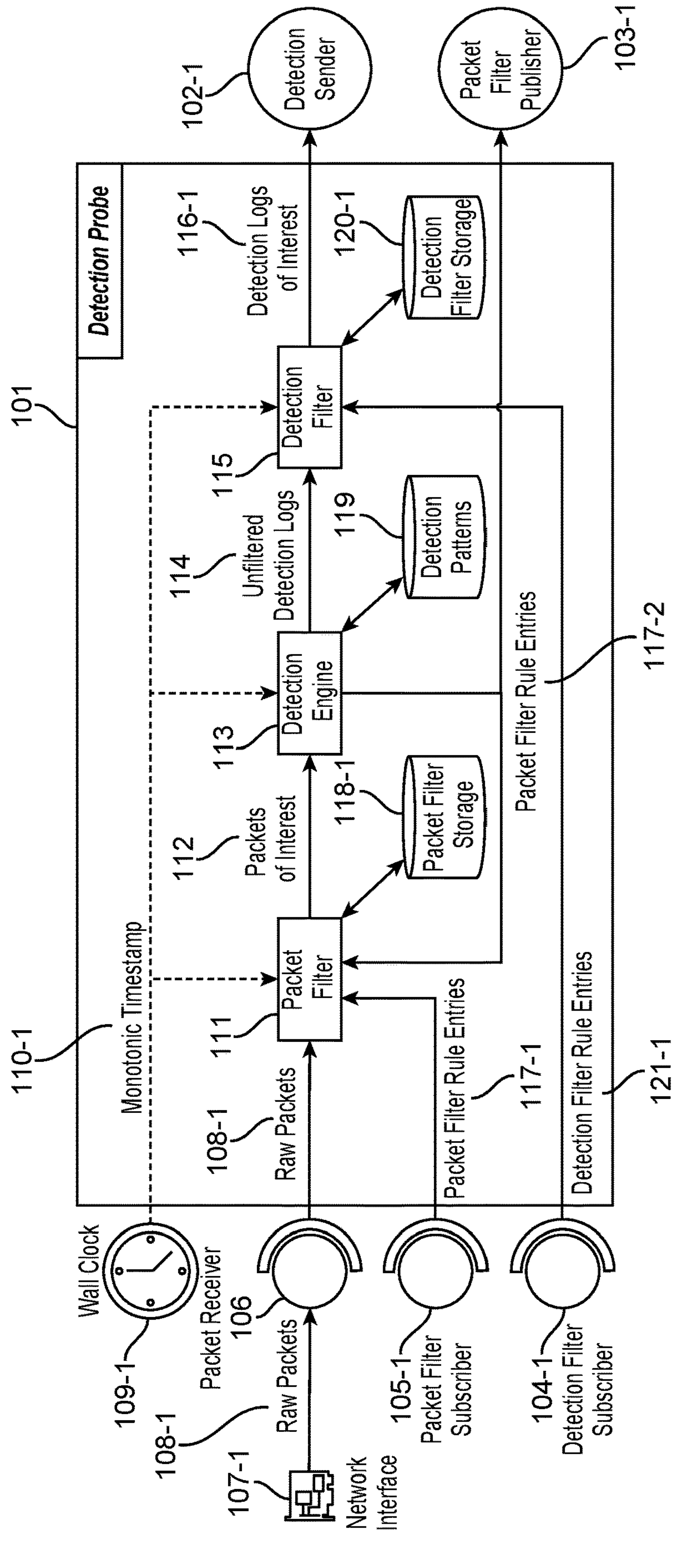
FIG. 2 shows a block diagram of a detection probe in accordance with an embodiment of the present invention.

FIG. 2 shows a block diagram of a detection probe 101 in accordance with an embodiment of the present invention. The detection probe 101 receives raw packets 108-1 from a network interface 107-1. The detection probe 101 receives time information from a wall clock 109-1 to generate a monotonic timestamp 110-1.

A "packet" may be an Open Systems Interconnection (OSI) layer 3 Internet Protocol (IP) packet, OSI layer 2 Frame, a Controller Area Network (CAN) bus frame, or other unit of network traffic data.

A "network interface" may be a physical or virtual interface to an in-vehicle Ethernet network, CAN bus, Modbus network, etc. "Raw Packets" are packets captured by a network interface from a communication network being monitored. The format (i.e., the structures of sequential bitwise fields) of the raw packets may thus vary with different types of network interfaces. A "session" is the combination of key fields of the raw packets. Filtered with the key fields of a specified session, selected raw packets can be all attributed to a sequence of packets related to a specified connection. For example, an Ethernet session could contain the following key fields: Ether type (e.g., IPv4, Ipv6, . . . , etc.), source IP address, destination IP address, protocol type (e.g., TCP, UDP, ICMP, . . . , etc.), source port, destination port, etc. The key fields may vary with different types of packets according to implementation details. The purpose of choosing the proper key fields is to make a unique key field combination for distinguishing and filtering different sessions effectively.

"Wall clock" indicates a reference time source. In one embodiment, each node of the IDPS has its own wall clock. In one embodiment, the wall clock 109-1 provides UTC time that has been adjusted by best effort. In other words, a wall clock does not necessarily have to provide perfectly accurate time. System clocks of devices that cannot be synchronized with a standard time server can always be set to zero at every boot up, which will still provide time intervals or differences between detections. "Monotonic Timestamp" indicates strictly incremental values of timestamp, which may be used for time drift reduction as further explained with reference to FIGS. 9 and 10. The packet filter 111, detection engine 113, and detection filter 115 use time information from the wall clock 109-1 for reference and to apply monotonic timestamps 110-1 on data they process.

The detection probe 101 further includes a packet filter subscriber 105-1, a detection filter subscriber 104-1, a detection sender 102-1, and a packet filter publisher 103-1.

"Sender" and "receiver" indicate a pair of endpoints for a unidirectional relationship, i.e., messaging from a sender to a receiver, that is required when connecting corresponding nodes of the IDPS. A receiver of a parent node can accept messages from multiple senders of child nodes, while a single sender of a child node can only connect to a single receiver of a parent node.

"Publisher" and "subscriber" indicate a pair of endpoints for a unidirectional relationship, i.e., messaging from publisher to subscriber, that is optional when connecting to corresponding nodes. A publisher of a parent node can send messages to multiple subscribers of child nodes. A subscriber of a child node may receive messages from a single publisher of a parent node, instead of from multiple publishers, due to the defined hierarchical relationship between software components.

In the example of FIG. 1, the detection probe 101 receives raw packets 108-1 from the network interface 107-1 via the packet receiver interface 106. The packet receiver interface 106 may be a user mode or kernel application programming interface (API), callback handler, packet capture interface, virtio-net device, etc. The packet filter 111 filters out selected packets from the raw packets 108-1 to generate packets of interest 112. This advantageously allows the detection engine 113 to just scan the packets of interest 112, instead of the entire raw packets 108-1, for better performance and efficiency.

Selected packets to be filtered out of the raw packets 108-1 may be described by one or more packet filter rule entries 117 (i.e., 117-1, 117-2). In the example of FIG. 2, the packet filter 111 may receive packet filter rule entries 117-1 from the packet filter subscriber 105-1 and packet filter rule entries 117-2 from the detection engine 113. The packet filter subscriber 105-1 may receive the packet filter rule entries 117-1 published by either a packet filter publisher 103 of a parent detection hub 201 (e.g., see FIG. 3, 103-2) or a packet filter publisher 103 of a parent detection correlation backend 301 (e.g., see FIG. 4, 103-3). The packet filter 111 may also receive packet filter rule entries 117-2 from the detection engine 113. Packet filter rule entries 117-1 and 117-2 are stored in a local packet filter storage 118-1 with an explicit expiration time for each entry.

The detection engine 113 scans the packets of interest 112 for data that match one or more detection patterns 119. A detection pattern 119 describes data that are indicative of a network threat (e.g., data noted in a Common Vulnerabilities and Exposures (CVE) alert) or otherwise relevant to network threat detection. The detection engine 113 outputs an unfiltered detection log 114 in response to detecting data that match a detection pattern 119. Unfiltered detection logs 114 may be unprioritized, very verbose, and not relevant for a given network condition.

The detection filter 115 filters out selected detection logs from the unfiltered detection logs 114 to generate detection logs of interest 116-1. Advantageously, the detection logs of interest 116-1, instead of the entire unfiltered detection logs 114, are sent by the detection sender 102-1 to a detection receiver 203 of a parent detection hub 201 (e.g., see FIG. 3, 203-1) or to a detection receiver 203 of a parent detection correlation backend 301 (e.g., see FIG. 4, 203-2). The detection filter rule entries 121-1 describe the selected detection logs to be filtered out from the unfiltered detection logs 114. The detection filter 115 may receive the detection filter rule entries 121-1 from the detection filter subscriber 104-1. The detection filter subscriber 104-1 may receive the detection filter rule entries 121-1 published by either a detection filter publisher 202 of a parent detection hub 201 (e.g., see FIG. 3, 202-1) or a detection filter publisher 202 of a parent detection correlation backend 301 (e.g., see FIG. 4, 202-2). The detection filter rule entries 121-1 are stored in a local detection filter storage 120-1 with an explicit expiration time assigned to each entry.

The detection engine 113 determines, from the detection patterns 119, which sessions can be skipped rather than scanned thoroughly when there is no more possible matching with any further packets of the sessions. As a particular example, a detection pattern 119 may identify which packets of a session need to be scanned, and when those packets have been scanned and found to be normal, the other packets of the session may be skipped for scanning. The detection engine 113 can proactively notify the packet filter 111 with corresponding packet filter rule entries 117-2 in order to temporarily stop scanning of packets of certain sessions for a configurable duration of time. The packet filter rule entries 117-2 generated by the detection engine 113 may also be sent out by the packet filter publisher 103-1 to a packet filter subscriber 105 of a parent detection hub 201 (e.g., see FIG. 3, 105-2) to allow the parent detection hub 201 to keep track of packet filter rule entries in the detection probe 101.

Figure 3:
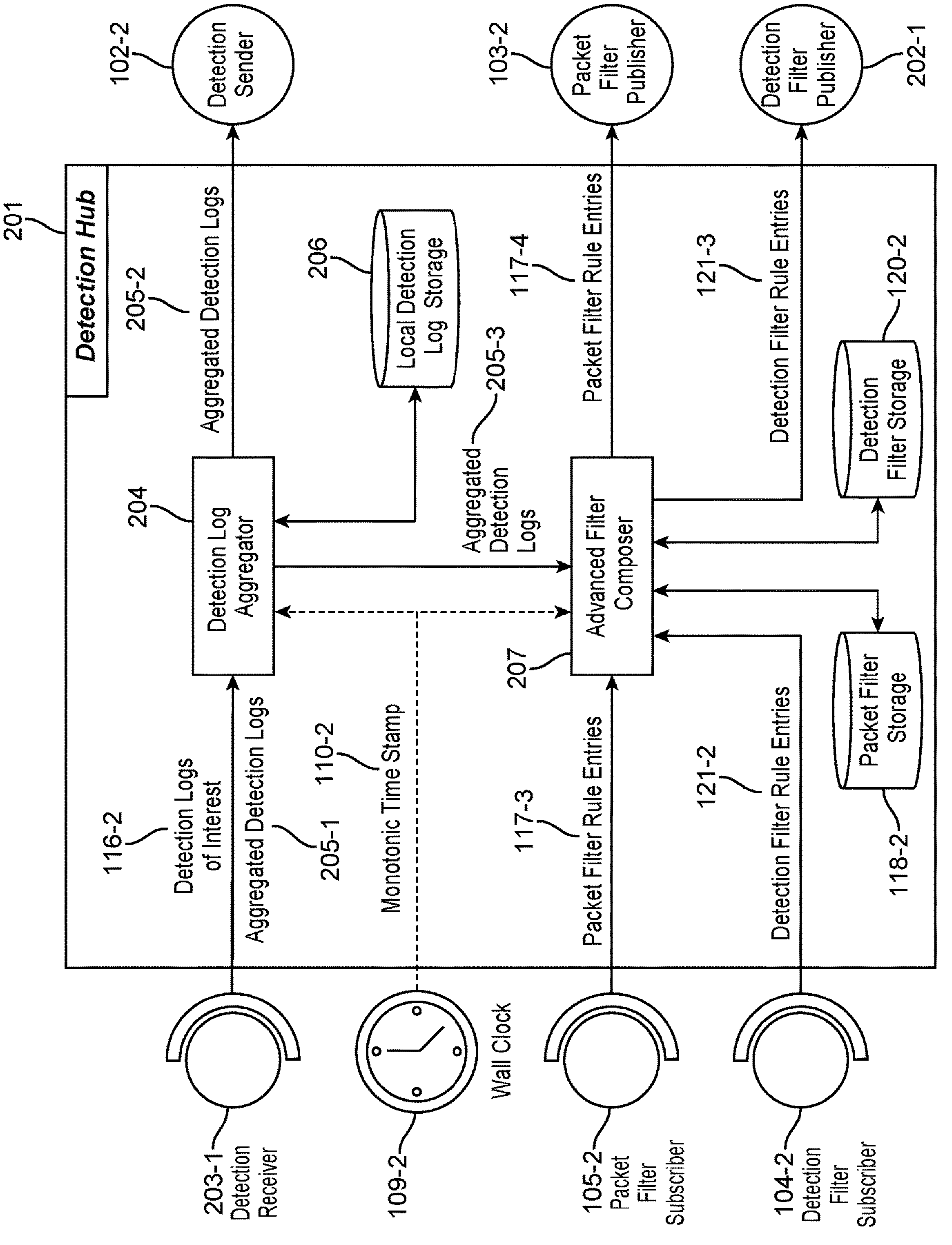
FIG. 3 shows a block diagram of a detection hub in accordance with an embodiment of the present invention.

FIG. 3 shows a block diagram of a detection hub 201 in accordance with an embodiment of the present invention. The detection hub 201 is configured to dispatch detection logs of interest, aggregated detection logs, packet filter rule entries, and detection filter rule entries to nodes of the IDPS. The detection hub 201 comprises a detection log aggregator 204 and an advanced filter composer 207. The detection log aggregator 204 and the advanced filter composer 207 use time information from a wall clock 109-2 for reference and to apply monotonic timestamps 110-2 on data they process.

The detection hub 201 is configured to aggregate incoming detection logs, including incoming detection logs of interest 116-2 from child detection probes 101 and incoming aggregated detection logs 205-1 from child detection hubs 201. The detection log aggregator 204 removes redundant (i.e., duplicate) detection logs from the detection logs of interest 116-2 and aggregated detection logs of interest 205-1 to generate the aggregated detection logs 205-2. The detection log aggregator 204 may identify redundant detection logs based on their subjects and timestamps. The aggregated detection logs 205-2 are stored by the detection log aggregator 204 in a local detection log storage 206, with limited count and duration.

The detection log aggregator 204 sends the aggregated detection logs 205-2 to a parent detection hub 201 or a parent detection correlation backend 301 by way of a detection sender 102-2. Aggregated detection logs 205-3 include the aggregated detection logs 205-2 and historical detection logs previously stored in the detection log storage 206. The advanced filter composer 207 identifies redundant detection logs in the aggregated detection logs 205-3 to generate corresponding detection filter rule entries 121-3 that describe the redundant detection logs. The detection filter rule entries 121-3 allow redundant detection logs to be filtered out in child nodes.

The detection hub 201 includes a packet filter subscriber 105-2 for receiving external packet filter rule entries 117-3 and a detection filter subscriber 104-2 for receiving external detection filter rule entries 121-2. The advanced filter composer 207 generates packet filter rule entries 117-4, which are packet filter rule entries from among the packet filter rule entries 117-3 that are not in child nodes of the detection hub 201. Packet filter rule entries that are in child nodes of the detection hub 201 are stored in a local packet filter storage 118-2.

Similarly, the advanced filter composer 207 generates detection filter rule entries 121-3, which are detection filter rule entries from among the detection filter rule entries 121-2 that are not in child nodes of the detection hub 201. Detection filter rule entries that are in child nodes of the detection hub 201 are stored in a local detection filter storage 120-2.

The detection hub 201 includes a packet filter publisher 103-2 for sending out the packet filter rule entries 117-4 to its child nodes, which may be one or more detection probes 101 and/or one or more detection hubs 201. This allows the packet filter rule entries 117-4 to be propagated through child nodes until the endpoint detection probes 101. Similarly, the detection hub 201 includes a detection filter publisher 202-1 for sending out the detection filter rule entries 121-3 to attached child nodes, which may be one or more detection probes 101 and/or one or more detection hubs 201. This allows the detection filter rule entries 121-3 to be propagated through all child nodes until the endpoint detection probes 101.

Figure 4:
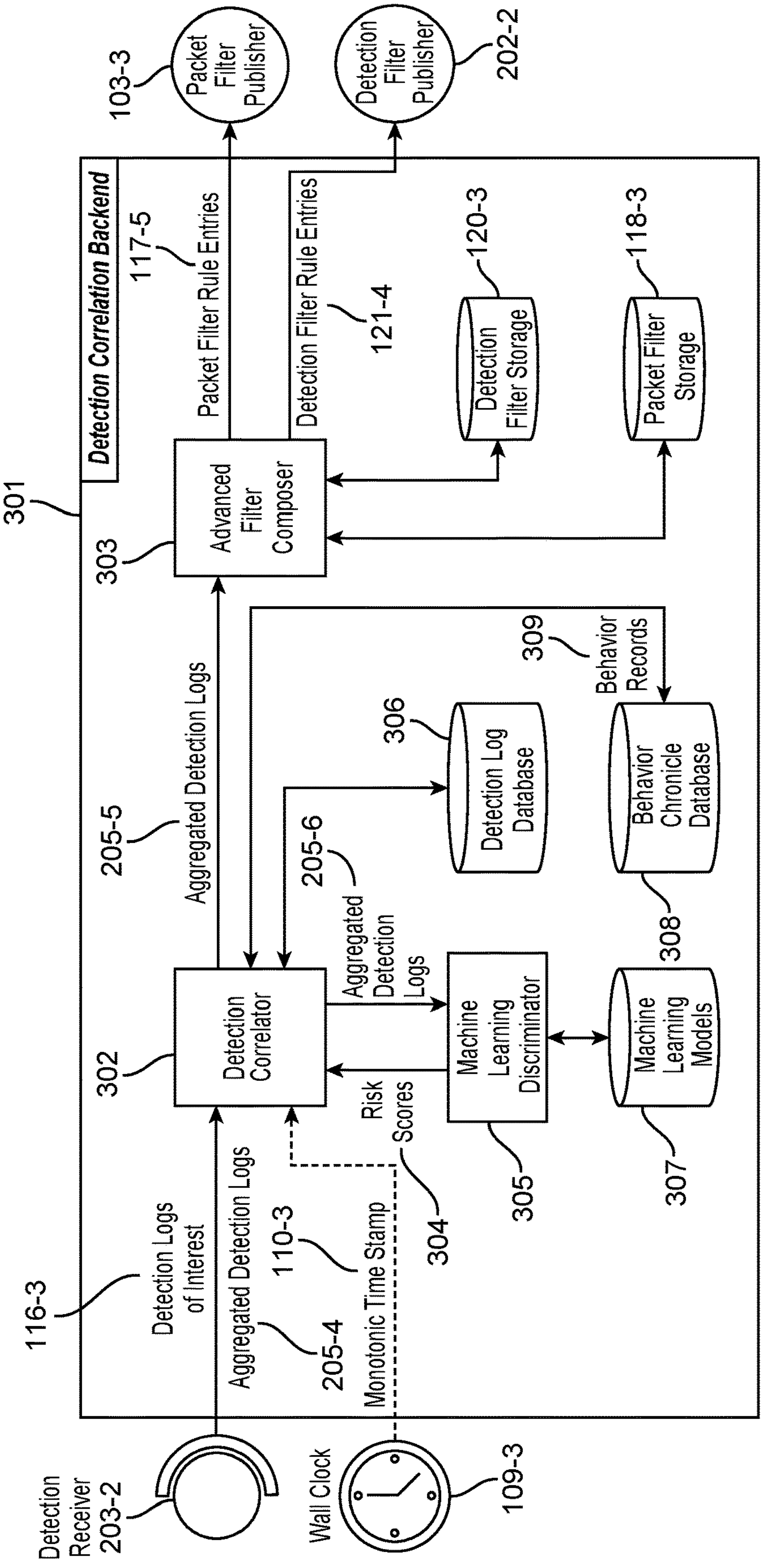
FIG. 4 shows a block diagram of a detection correlation backend in accordance with an embodiment of the present invention.

FIG. 4 shows a block diagram of a detection correlation backend 301 in accordance with an embodiment of the present invention. The detection correlation backend 301 may comprise a detection correlator 302, an advanced filter composer 303, and a machine learning discriminator 305. The detection correlator 302 uses time information from a wall clock 109-3 for reference and to apply monotonic timestamps 110-3 on data it processes. In one embodiment, the detection correlation backend 301 is offboard, hosted by the backend system 171 (shown in FIG. 1) on the cloud.

The detection correlation backend 301 includes a detection receiver 203-2 for receiving external detection logs of interest 116-3 and external aggregated detection logs 205-4 from child nodes, which may be one or more detection probes 101 and/or one or more detection hubs 201. The detection correlator 302 removes redundant detection logs from the detection logs of interest 116-3 and aggregated detection logs 205-4 to generate the aggregated detection logs 205-5, which are stored in a detection log database 306.

Aggregated detection logs 205-6 include the aggregated detection logs 205-5 and historical detection logs previously stored in the detection log database 306. The machine learning discriminator 305 employs one or more machine learning models 307 to assess the aggregated detection logs 205-6 to generate risk scores 304, one for each detection log. A risk score 304 indicates a severity of a possible network threat identified in a detection log. The detection correlator 302 declares that a network threat is found when a risk score 304 is higher than a risk threshold. Detection log entries in the detection log database 306 combined with corresponding risk scores 304 can be correlated into behavior records 309, which are stored in a behavior chronicles database 308.

A behavior record describes a security event indicated in a detection log. A behavior record may include: (a) an event ID that identifies the event, which can be encoded to describe distinct detection subjects; (b) start time (e.g., in UTC seconds) when the event started; (c) end time (e.g., in UTC seconds) when the event ended; (d) occurrences or count of the event occurring consecutively; and (e) source globally unique identifiers (GUIDs) that distinctly identify detection probes that detected the event in different execution environments.

Behavior records may be supported by tables or data structures that add additional information in other dimensions, such as: (a) table of hierarchy of source GUIDs to describe the path through the detection probes; table of event IDs, event subjects, descriptions, risk scores, and other informative attributes; and table of external related events with specific periods, including campaigns, breaches, patch releases, CVEs, and so on.

The severity of a security event indicated in a behavior record may be calculated in various ways. For example, for each behavior record, severity may be calculated based on frequency (i.e., occurrences/(end time−start time)) and the risk score of the corresponding detection log. Given normalized severity levels to be a floating number between 0.0 and 1.0, a severity level may be calculated as, $$\text{Severity Level}=\tanh(\text{frequency}*\text{risk score}),\ \text{where}\ \text{frequency}>=0,\text{risk score}>=0$$

By correlating the behavior records (with severity levels) and external related events in sequence found by a temporal ranges, patterns for distinguishing whether a series of security events is relevant or irrelevant may be identified.

The advanced filter composer 303 identifies redundant detection logs from the aggregated detection logs 205-5 and generates corresponding detection filter rule entries 117-5 that its child nodes can use to remove redundant detection logs. The advanced filter composer 303 also generates packet filter rule entries 117-5 that describe packets that are not of interest (e.g., part of sessions that have been evaluated as normal) and thus should be filtered out by its child nodes. The packet filter rule entries 117-5 and detection filter rule entries 121-4 are stored in a packet filter storage 118-3 and a detection filter storage 120-3, respectively.

The detection correlation backend 301 includes a packet filter publisher 103-3 for sending the packet filter rule entries 117-5 to packet filter subscribers of child nodes, which may be one or more detection probes 101 and/or one or more detection hubs 201. The detection correlation backend 301 further includes a detection filter publisher 202-2 for sending the detection filter rules entries 121-4 to detection filter subscribers of child nodes, which may be one or more detection probes 101 and/or one or more detection hubs 201.

Example deployments of nodes of an IDPS in accordance with embodiments of the present invention are now explained in FIGS. 5-8.

Figure 5:
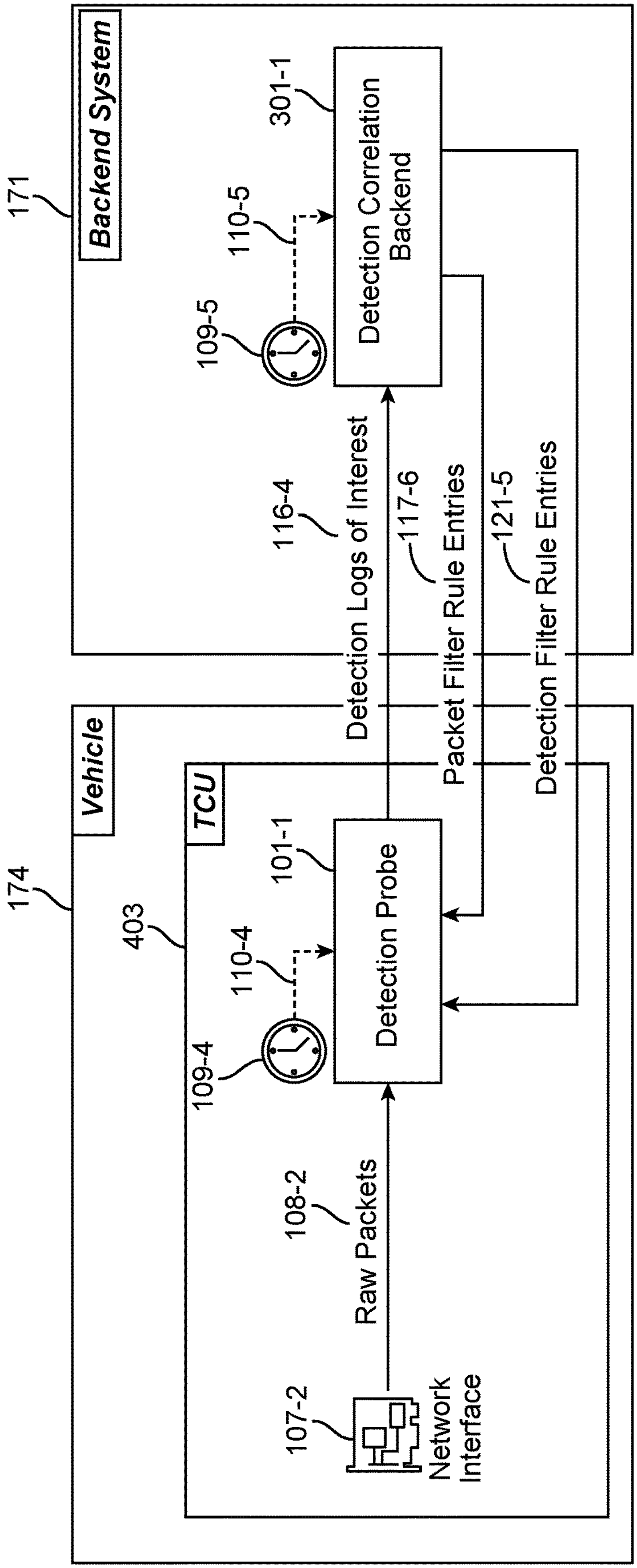
FIG. 5 shows an example deployment of an IDPS with a single detection probe and a single detection correlation backend in accordance with an embodiment of the present invention.

FIG. 5 shows an example deployment of an IDPS with a single detection probe and a single detection correlation backend in accordance with an embodiment of the present invention. In the example of FIG. 5, a single detection probe 101-1 is running in a telematic control unit (TCU) 403 of the vehicle 174 and a detection correlation backend 301-1 is hosted on the cloud in the backend system 171 (shown in FIG. 1). The TCU 403 is implemented as an ECU of the vehicle 174.

In the example of FIG. 5, the detection probe 101-1 receives raw packets 108-2 from a network interface 107-2, which is attached to a communication network (e.g., CAN bus) of the vehicle 174 being monitored for network threats. The raw packets 108-2 are from network traffic on the communication network. The detection probe 101-1 scans the raw packets 108-2 for data indicative of network threats and outputs corresponding detection logs of interest 116-4 to a parent node, which in this example is the detection correlation backend 301-1. The detection probe 101-1 applies monotonic timestamps 110-4 on the detection logs of interest 116-4 using time information from a wall clock 109-4.

The detection correlation backend 301-1 evaluates the detection logs of interest 116-4 to detect network threats. The detection correlation backend 301-1 uses time information from a wall clock 109-5 for reference and to apply monotonic timestamps 110-5 on data it processes. The detection correlation backend 301-1 also outputs packet filter rule entries 117-6 and detection filter rule entries 121-5 to a child node, which in this example is the detection probe 101-1. The detection probe 101-1 employs the packet filter rule entries 117-6 to selectively scan the raw packets 108-2, by not scanning packets described by the packet filter rule entries 117-6. The detection probe 101-1 generates the detection logs of interest 116-4 by filtering out detection logs described by the detection filter rule entries 121-5.

Figure 6:
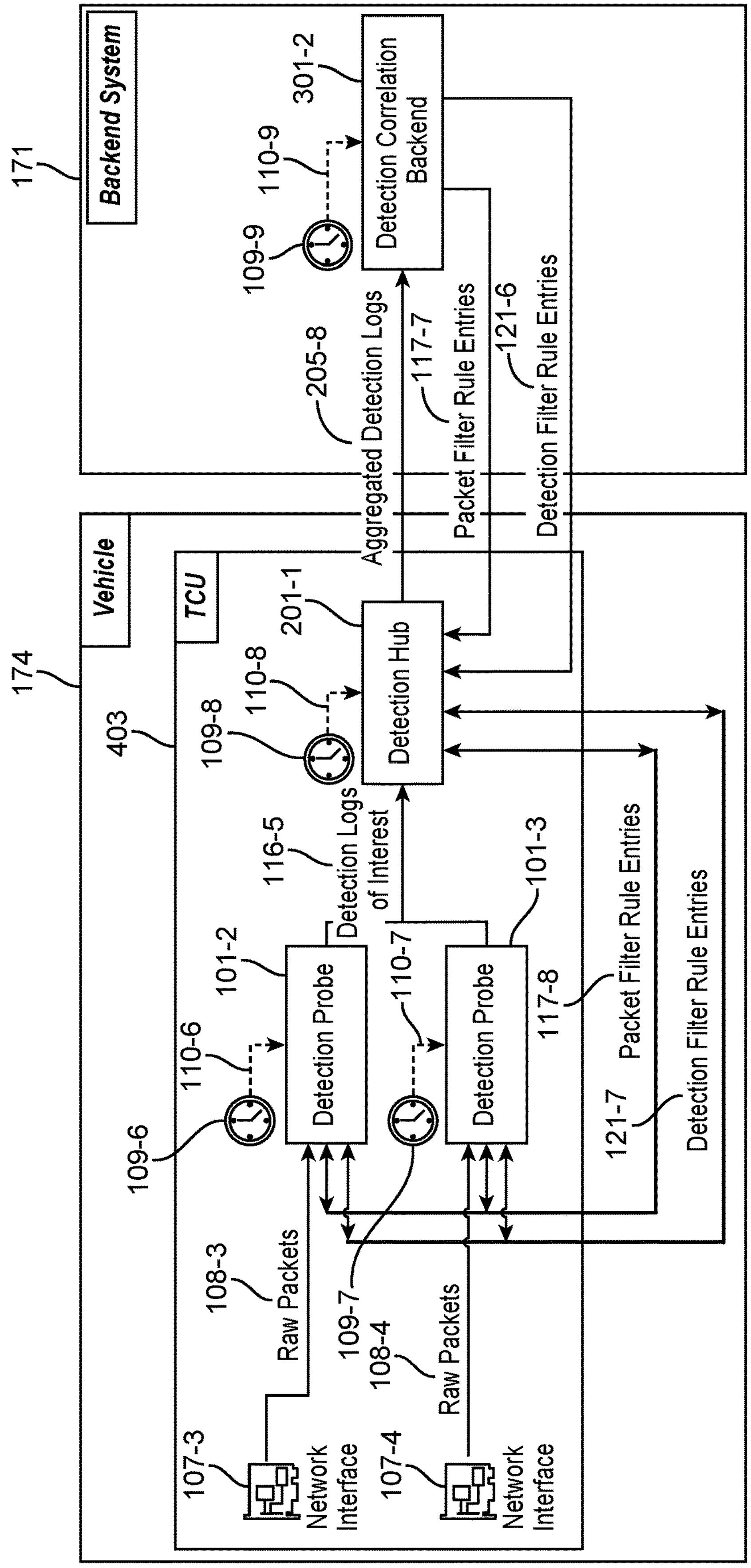
FIG. 6 shows an example deployment of an IDPS with multiple detection probes, a single detection hub, and a single detection correlation backend in accordance with an embodiment of the present invention.

FIG. 6 shows an example deployment of an IDPS with multiple detection probes, a single detection hub, and a single detection correlation backend in accordance with an embodiment of the present invention.

In the example of FIG. 6, a detection probe 101-2, a detection probe 101-3, and a detection hub 201-1 are running in the TCU 403, and a detection correlation backend 301-2 is hosted on the cloud in the backend system 171. The detection probe 101-2 receives raw packets 108-3 from a network interface 107-3, and the detection probe 101-3 receives raw packets 108-4 from a network interface 107-4. The network interfaces 107-3 and 107-4 are each connected to separate communication networks being monitored for network threats.

The detection probes 101-2 and 101-3 use time information from wall clocks 109-6 and 109-7 for reference and to apply monotonic timestamps 110-6 and 110-7, respectively, on data they process. The detection probes 101-2 and 101-3 scan the raw packets 108-3 and 108-4, respectively, for data indicative of network threats and output corresponding detection logs of interest 116-5 to the detection hub 201-1. The detection hub 201 aggregates the detection logs of interest 116-5, by removing redundant detection logs, into aggregated detection logs 205-8.

The detection correlation backend 301-2 uses time information from a wall clock 109-9 for reference and to apply monotonic timestamps 110-9 on data it processes. The detection correlation backend 301-2 receives and evaluates the aggregated detection logs 205-8 for network threats. The detection correlation backend 301-2 also outputs packet filter rule entries 117-7 and detection filter rule entries 121-6 to its child node, which in this example is the detection hub 201-1.

The detection hub 201-1 uses time information from a wall clock 109-8 for reference and to apply monotonic timestamps 110-8 on data that it processes. The detection hub 201-1 keeps track of filter rule entries that are locally stored in the detection probes 101-2 and 101-3. When the detection hub 201-1 receives the packet filter rule entries 117-7 and detection filter rule entries 121-6 from the detection correlation backend 301-2, the detection hub 201-1 will deliver to its child detection probes 101-2 and 101-3 only filter rule entries that are not in the detection probes 101-2 and 101-3. In FIG. 6, the lines for packet filter rule entries 117-8 and detection filter rule entries 121-7 are bolded to indicate multiple unidirectional callbacks between packet filter publisher-subscriber pairs and detection filter publisher-subscriber pairs. The detection probes 101-2 and 10-3 employ the filter rule entries to selectively scan raw packets and to generate detection logs of interest.

Figure 7:
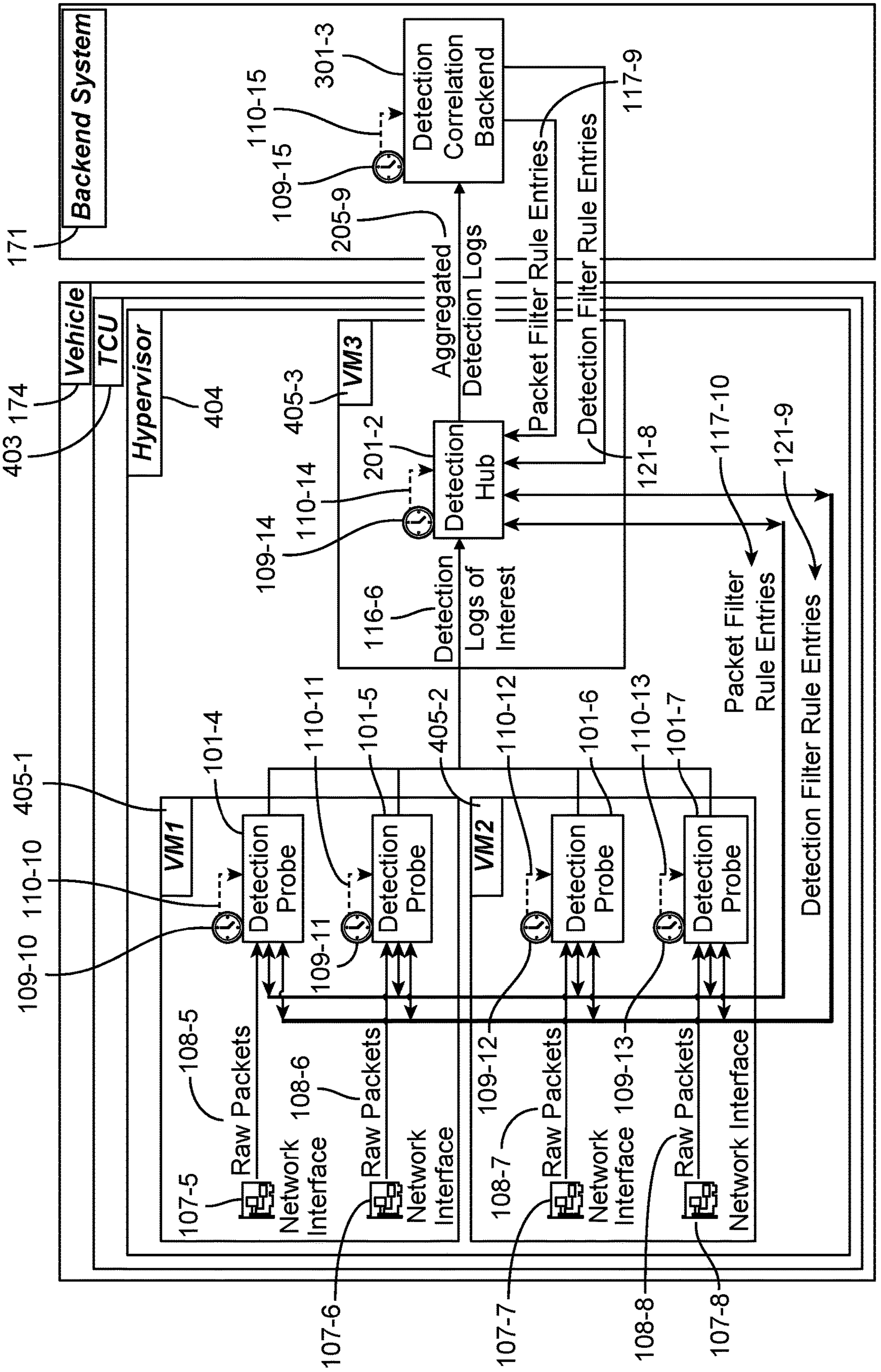
FIG. 7 shows an example deployment of an IDPS with detection probes and a detection hub that are running in virtual machines in accordance with an embodiment of the present invention.

FIG. 7 shows an example deployment of an IDPS with detection probes and a detection hub that are running in virtual machines in accordance with an embodiment of the present invention. In the example of FIG. 7, a detection probe 101-4, a detection probe 101-5, a detection probe 101-6, a detection probe 101-7, and a detection hub 201-2 are running in the TCU 403 of the vehicle 174. A detection correlation backend 301-3 is hosted on the cloud in the backend system 171. A hypervisor 404 is running in the TCU 403. A first virtual machine 405-1, a second virtual machine 405-2, and a third virtual machine 405-3 are running under the hypervisor 404. The virtual machines 405 provide separate execution environments for the nodes of the IDPS.

The detection probes 101-4 and 101-5 are running in the virtual machine 405-1. The detection probe 101-4 receives raw packets 108-5 from a network interface 107-5, and the detection probe 101-5 receives raw packets 108-6 from a network interface 107-6. The network interfaces 107-5 and 107-6 are virtual network interfaces that are each connected to separate virtual communication networks being monitored for network threats. The detection probes 101-4 and 101-5 use time information from wall clocks 109-10 and 109-11 for reference and to apply monotonic timestamps 110-10 and 110-11, respectively, to data that they process.

The detection probes 101-6 and 101-7 are running in the virtual machine 405-2. The detection probe 101-6 receives raw packets 108-7 from a network interface 107-7, and the detection probe 101-7 receives raw packets 108-8 from a network interface 107-8. The network interfaces 107-7 and 107-8 are virtual network interfaces that are each connected to separate virtual communication networks being monitored for network threats. The detection probes 101-6 and 101-7 use time information from wall clocks 109-12 and 109-13 for reference and to apply monotonic timestamps 110-12 and 110-13, respectively, to data that they process.

The detection probes 101-4, 101-5, 101-6, and 101-7 scan raw packets for data indicative of network threats and output corresponding detection logs of interest 116-6. The detection hub 201-2 receives the detection logs of interest 116-6 by way of the hypervisor 404. The detection hub 201-2 uses time information from a wall clock 109-14 for reference and to apply monotonic timestamps 110-14 to data that it processes. The detection hub 201-2 removes redundant detection logs from the detection logs of interest 116-6 to generate the aggregated detection logs 205-9, which the detection hub 201-2 sends to the detection correlation backend 301-3.

The detection correlation backend 301-3 is on the cloud hosted by the backend system 171. The detection correlation backend 301-3 receives and evaluates the aggregated detection logs 205-9 for network threats. The detection correlation backend 301-1 also outputs packet filter rule entries 117-9 and detection filter rule entries 121-8 to one or more child nodes, which in this example is the detection hub 201-2. The detection correlation backend 301-3 uses time information from a wall clock 109-15 for reference and to apply monotonic timestamps 110-15 on data that it processes.

The detection hub 201-2 keeps track of detection filter rule entries and packet filter rule entries that are locally stored in its child detection probes 101-4, 101-5, 101-6, and 101-7. When the detection hub 201-2 receives the packet filter rule entries 117-9 and detection filter rule entries 121-8 from the detection correlation backend 301-3, the detection hub 201-2 will deliver to its child detection probes only filter rule entries that are not in its child detection probes. In FIG. 7, the lines for packet filter rule entries 117-10 and detection filter rule entries 121-9 are bolded to indicate multiple unidirectional callbacks between packet filter publisher-subscriber pairs and detection filter publisher-subscriber pairs. The child detection probes of the detection hub 201-2 employ the filter rule entries to selectively scan raw packets and to generate detection logs of interest.

Figure 8:
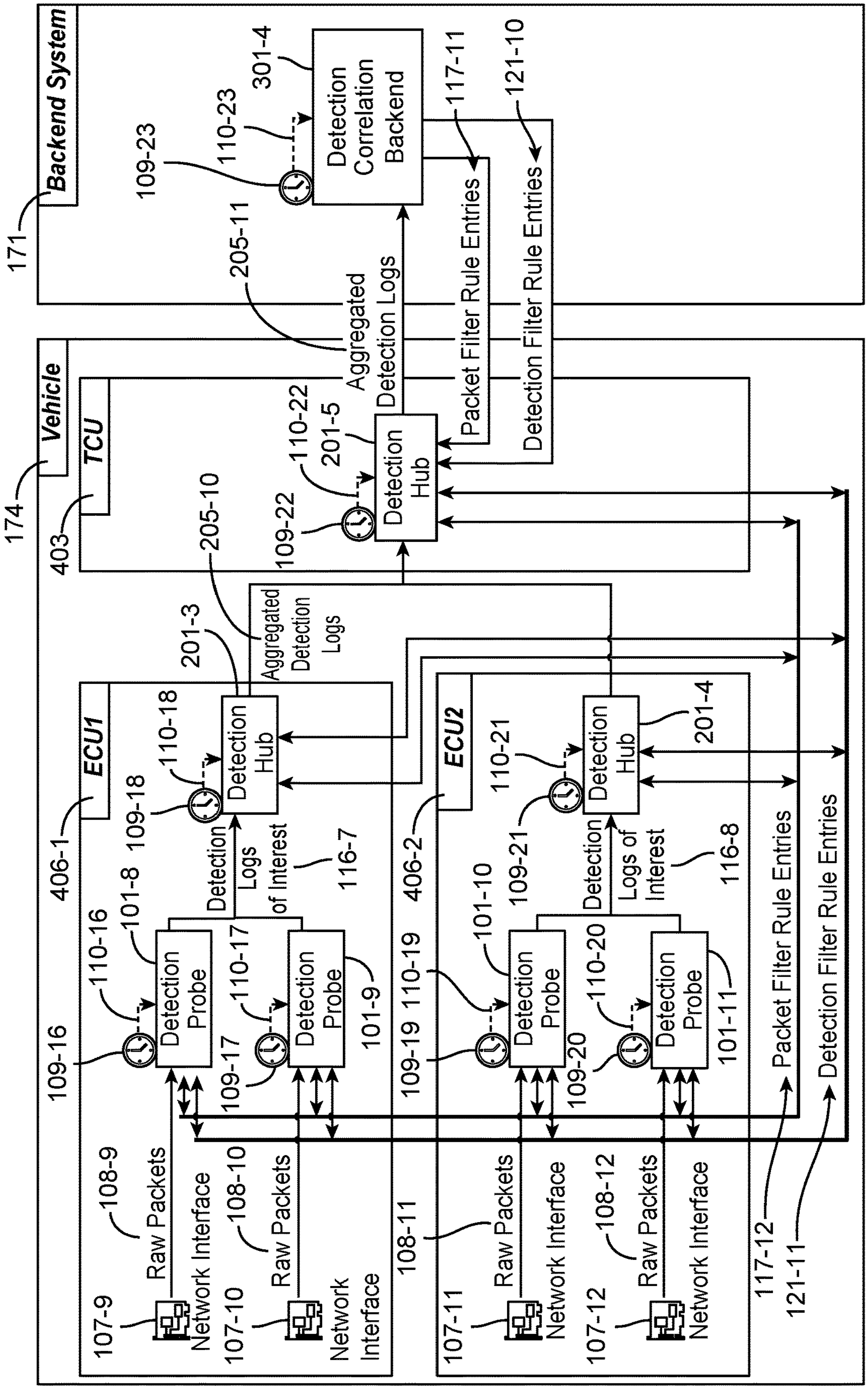
FIG. 8 shows an example deployment of an IDPS with detection probes and detection hubs that are running in separate ECUs of a connected vehicle in accordance with an embodiment of the present invention.

FIG. 8 shows an example deployment of an IDPS with detection probes and detection hubs that are running in separate ECUs of a connected vehicle in accordance with an embodiment of the present invention.

In the example of FIG. 8, a detection probe 101-8, a detection probe 101-9, and a detection hub 201-3 are running in an ECU 406-1. The detection probe 101-8 receives raw packets 108-9 from a network interface 107-9, and the detection probe 101-9 receives raw packets 108-10 from a network interface 107-10. The network interfaces 107-9 and 107-10 are each connected to separate communication networks being monitored for network threats. The detection probes 101-8 and 101-9 use time information from wall clocks 109-16 and 109-17 for reference and to apply monotonic timestamps 110-16 and 110-17, respectively, to data that they process.

The detection probes 101-8 and 101-9 scan raw packets for data indicative of network threats and output corresponding detection logs of interest 116-7, which are sent to the detection hub 201-3. The detection hub 201-3 uses time information from a wall clock 109-18 for reference and to apply monotonic timestamps 110-18 to data that it processes. The detection hub 201-3 removes redundant detection logs from the detection logs of interest 116-7 to generate aggregated detection logs 205-10, which the detection hub 201-3 sends to the detection hub 201-5 running in the TCU 403.

A detection probe 101-10, a detection probe 101-11, and a detection hub 201-4 are running in an ECU 406-2. The detection probe 101-10 receives raw packets 108-11 from a network interface 107-11, and the detection probe 101-11 receives raw packets 108-12 from a network interface 107-12. The network interfaces 107-11 and 107-12 are each connected to separate communication networks being monitored for network threats. The detection probes 101-10 and 101-11 use time information from wall clocks 109-19 and 109-20 for reference and to apply monotonic timestamps 110-19 and 110-20, respectively, to data that they process.

The detection probes 101-10 and 101-11 scan raw packets for data indicative of network threats and output corresponding detection logs of interest 116-8, which are sent to the detection hub 201-4. The detection hub 201-4 uses time information from a wall clock 109-21 for reference and to apply monotonic timestamps 110-21 to data that it processes. The detection hub 201-4 removes redundant detection logs from the detection logs of interest 116-8 to generate aggregated detection logs 205-10, which the detection hub 201-4 sends to the detection hub 201-5 in the TCU 403.

The detection hub 201-5 receives the aggregated detection logs 205-10 from its child detection hubs 201-3 and 201-4. The detection hub 201-5 uses time information from a wall clock 109-22 for reference and to apply monotonic timestamps 110-22 to data that it processes. The detection hub 201-5 removes redundant detection logs from the aggregated detection logs 205-10 to generate aggregated detection logs 205-11, which the detection hub 201-5 sends to the detection correlation backend 301-4.

The detection correlation backend 301-4 is on the cloud hosted by the backend system 171. The detection correlation backend 301-4 receives and evaluates the aggregated detection logs 205-10 for network threats. The detection correlation backend 301-4 also outputs packet filter rule entries 117-11 and detection filter rule entries 121-10 to one or more child nodes, which in this example is the detection hub 201-5. The detection correlation backend 301-4 uses time information from a wall clock 109-23 for reference and to apply monotonic timestamps 110-23 on data that it processes.

The ECU 406-1, ECU 406-2, TCU 403, and backend system 171 provide different execution environments, each having its own operating system. The ECU 406-1 and the ECU 406-2 are not connected to the public Internet; Internet connectivity to the backend system 171 is provided by the TCU 403. To collect and upload detection logs through restricted networks and between different execution environments, the detection hubs on respective ECUs are configured to connect to child detection probes and child detection hubs. In general, a detection hub should only operate on messages to or from its direct child nodes and direct parent node. In the example of FIG. 8, this is implemented with the detection probes 101-8 and 101-9 being connected to a parent detection hub 201-3, the detection probes 101-10 and 101-11 being connected to a parent detection hub 201-4, the detection hubs 201-3 and 201-4 being connected to a parent detection hub 201-5, and the detection hub 201-5 being connected to a parent detection correlation backend 301-4.

The detection hub 201-5 keeps track of detection filter rule entries and packet filter rule entries that are locally stored in its child detection hubs 201-3 and 201-4. When the detection hub 201-5 receives the packet filter rule entries 117-11 and detection filter rule entries 121-10 from the detection correlation backend 301-4, the detection hub 201-5 will deliver to its child detection hubs only filter rule entries that are not in its child detection hubs.

The detection hubs 201-3 and 201-4 keep track of detection filter rule entries and packet filter rule entries that are locally stored in their respective child detection probes (i.e., detection probes 101-8 and 101-9 for the detection hub 201-3; detection probes 101-10 and 101-11 for the detection hub 201-4).

When the detection hubs 201-3 and 201-4 receive packet filter rule entries and detection filter rule entries from the detection hub 201-5, the detection hubs 201-3 and 201-4 will deliver to their respective child detection probes only filter rule entries that are not in their respective child detection probes. The child detection probes employ the filter rule entries to selectively scan raw packets and to generate detection logs of interest. In FIG. 8, the lines for packet filter rule entries 117-12 and detection filter rule entries 121-11 are bolded to indicate multiple unidirectional callbacks between packet filter publisher-subscriber pairs and detection filter publisher-subscriber pairs.

Time between IDPS nodes (i.e., detection probes, detection hubs, and detection correlation backend) are synchronized for proper operation. Accordingly, each node has its own wall clock for providing time information, which may be a local system time or adjusted global time. Wall clocks in different deployment scenarios may vary depending on their precision. Nodes with Internet connectivity, such as nodes in the TCU 403 and backend system 171, can frequently synchronize their wall clocks via Network Time Protocol (NTP), described in RFC 5905, or any updated time standard.

Virtual machine environments have a certain amount of time delay due to the latency of sharing and context switching executed by the hypervisor. The hypervisor can adjust the virtual wall clock for each virtual machine when the time differences between virtual machines exceed predefined limits. This may result in time drifts in virtual machine environments.

Some ECUs have restricted network access and thus cannot synchronize their wall clocks with NTP. To keep the correct timing between such ECUs, some standard timing algorithm or mechanism may be applied, such as Precision Time Protocol (PTP) compliant with IEEE 1588 and Time-Sensitive Networking (TSN).

To prevent or minimize time drifts, nodes of the present invention employ monotonic timestamps that are defined to have strictly incremental values. The monotonic timestamps may be in Unix epoch time (also referred to as Posix time, the total seconds since Jan. 1, 1970, in UTC) or a counter of uptime (i.e., total elapsed seconds since last successful boot).

Figure 9:
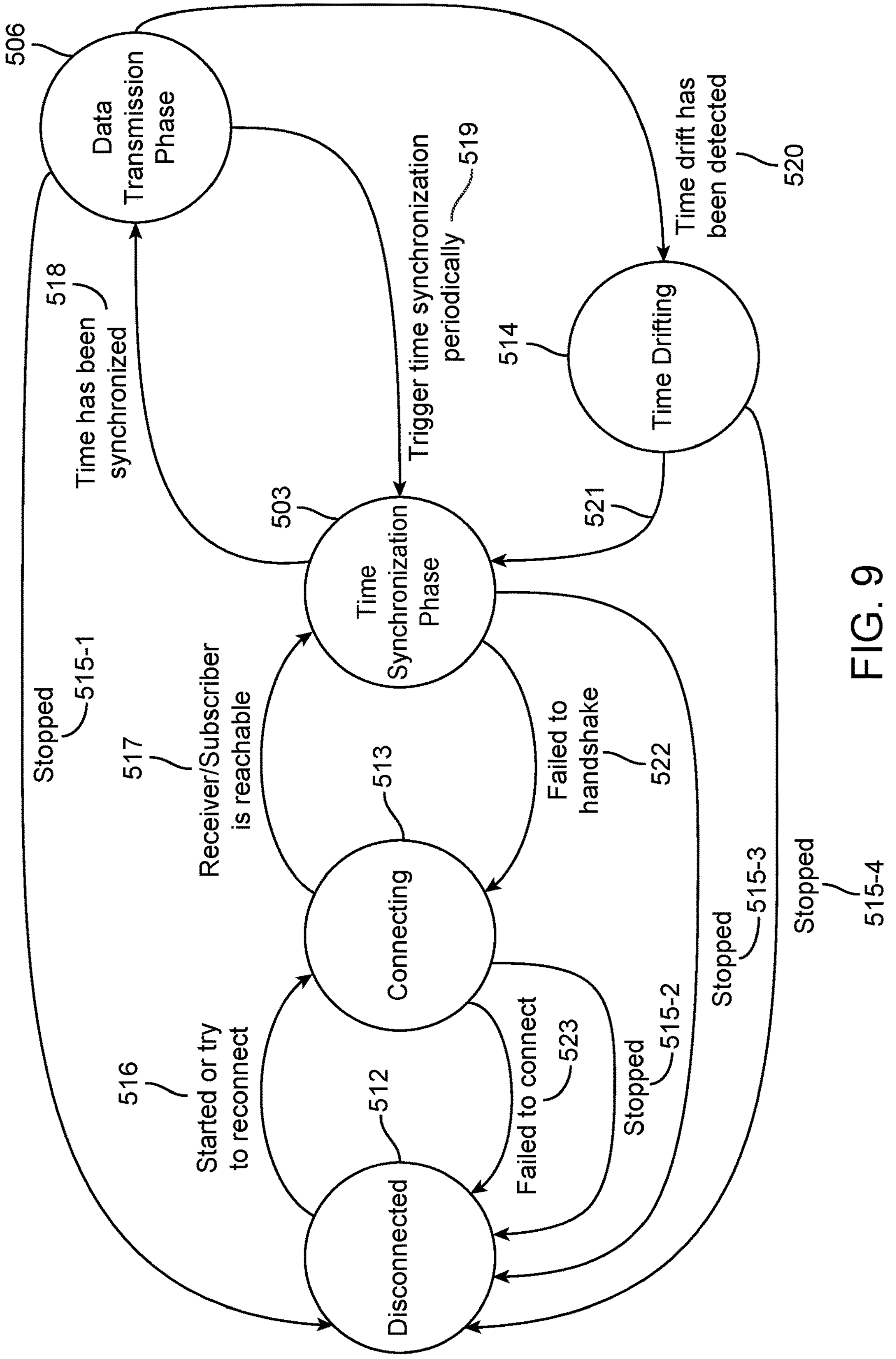
FIG. 9 shows a state diagram for time synchronization of detection probes, detection hubs, and detection correlation backend in accordance with an embodiment of the present invention.

FIG. 9 shows a state diagram for time synchronization of detection probes, detection hubs, and detection correlation backend in accordance with an embodiment of the present invention. The detection probes, detection hubs, and detection correlation backend are also referred to as “nodes”. Two nodes can be connected by connecting the sender/publisher of a node to a receiver/subscriber of the other node.

In the example of FIG. 9, a node starts in a disconnected state 512. A node returns to the disconnected state 512 from any of the other states when a connection to the node is stopped, as indicated by transitions 515 (i.e., 515-1, 515-2, 515-3, 515-4).

From the disconnected state 512, a node starts to connect or tries to reconnect to another node by entering the connecting state 513 through the transition 516. The node re-enters the disconnected state 512 through the transition 523 when a connection cannot be established to the other node.

The sender/publisher of a node can connect to a receiver/subscriber of another node by way of an underlying channel, such as Data Distribution Service (DDS), Scalable service-Oriented MiddlewarE over IP (SOME/IP), User Datagram Protocol (UDP), Transmission Control Protocol (TCP), etc. If the receiver/subscriber is reachable, the channel between sender/publisher and the receiver/subscriber is established, and the sender/publisher and receiver/subscriber enter the time synchronization phase state 503 through the transition 517. The receiver/subscriber and sender/publisher re-enter the connecting state 513 through the transition 522 when they cannot successfully handshake to perform time synchronization.

Figure 10:
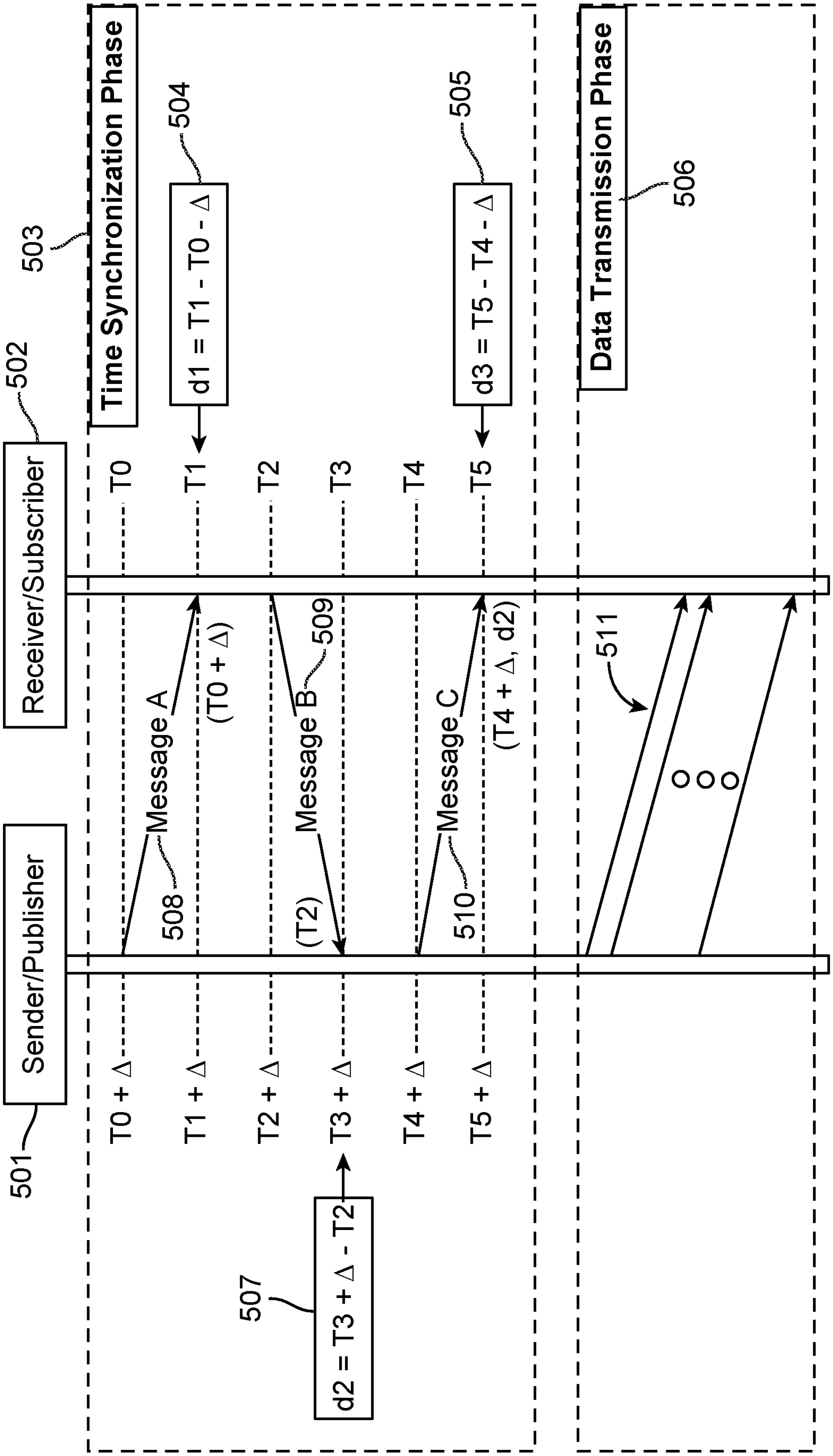
FIG. 10 shows a sequence diagram of a time synchronization phase state in the state diagram of FIG. 9, in accordance with an embodiment of the present invention.

FIG. 10 shows a sequence diagram of the time synchronization phase state 503 in accordance with an embodiment of the present invention. As shown in FIG. 10, when a sender/publisher 501 starts to negotiate with a receiver/subscriber 502, the sender/publisher 501 initiates a handshaking protocol where the messages A (FIG. 10, 508), B (FIG. 10, 509) and C (FIG. 10, 510) carry required information, including the source timestamps and the transit delays. The number of time synchronization steps can be greater than or equal to 3 (i.e., Messages A, B, and C). For some execution environments with transit delays that fluctuate a lot, the number of time synchronization steps may be increased to obtain a better estimation.

Assuming the timestamp in the receiver/subscriber 502 side is from a base wall clock for reference, there should be a nearly constant time offset (i.e., A in FIG. 10) between the sender/publisher 501 and receiver/subscriber 502 sides regarding the coincident timestamp values that they possess.

The average transit delay ($\bar{d}$) is defined by the below EQ. 1 and the average constant time offset ($\bar{\Delta}$) is defined in the below EQ. 2, wherein the definitions of the transit delays, including d1 (FIG. 10, 504), d2 (FIG. 10, 507), and d3 (FIG. 10, 505), are illustrated in FIG. 10.

$$\bar{d} = \frac{\frac{d_1 + d_2}{2} + \frac{d_2 - d_3}{2} + \ldots + \frac{d_{n-1} + d_n}{2} + \frac{d_n - d_{n+1}}{2}}{n} = \frac{\sum_{i=1}^{n}(d_i - d_{i+1})}{2n}, \quad \text{where } n = \{x | x \in N, x \neq 0\} \tag{EQ. 1}$$

$$\bar{\Delta} = \frac{d_2 + d_1}{2} + \frac{d_2 - d_3}{2} + \ldots + \frac{d_{n-1} - d_{n-1}}{2} + \frac{d_n + d_{n+1}}{2} = \frac{\sum_{i=1}^{\frac{n}{2}}(2d_{2i} - d_{2i-1} - d_{2i+1})}{2n}, \quad \text{where } n = \{2x | x \in N, x \neq 0\} \tag{EQ. 2}$$

The receiver/subscriber 502 tracks the average transit delay (d) and the average constant time offset (A) periodically.

Referring to FIG. 10, after the time synchronization phase state 503 has successfully completed (see also FIG. 9, transition 518), both the sender/publisher 501 and the receiver/subscriber 502 will enter the data transmission phase state 506. At the data transmission phase state 506, the sender/publisher 501 can then send consecutive messages (see FIG. 10, 511) to the receiver/subscriber 502. During the data transmission phase state 506, the receiver/subscriber 502 is responsible for periodically checking the average transit delay ($\bar{d}$) and average constant time offset ($\bar{\Delta}$) to ensure that they don’t drift beyond predefined tolerance ranges.

In certain abnormal circumstances, for example, if the receiver/subscriber 502 finds that the timestamps of consecutive messages are not ascending, the receiver/subscriber 502 assumes that time drift is occurring in the sender/publisher 501. In that case, the receiver/subscriber 502 can immediately check for time drift, which in FIG. 9 is by entering the time drifting state 514 through the transition 520.

Continuing in FIG. 9, when checking for time drift has been triggered either periodically (through the transition 519) or by abnormal circumstances (through the transition 521), the receiver/subscriber will notify the sender/publisher to enter the time synchronization phase state 503 to re-establish the connection and underlying channel between the receiver/subscriber and the sender/publisher.

While receiving messages, the nodes should normalize the timestamps of the messages with the corresponding constant time offsets regarding different message senders/publishers. After the proper timestamp normalization, each node can thus correctly sort the messages of various sources in temporal order.

Figure 11:
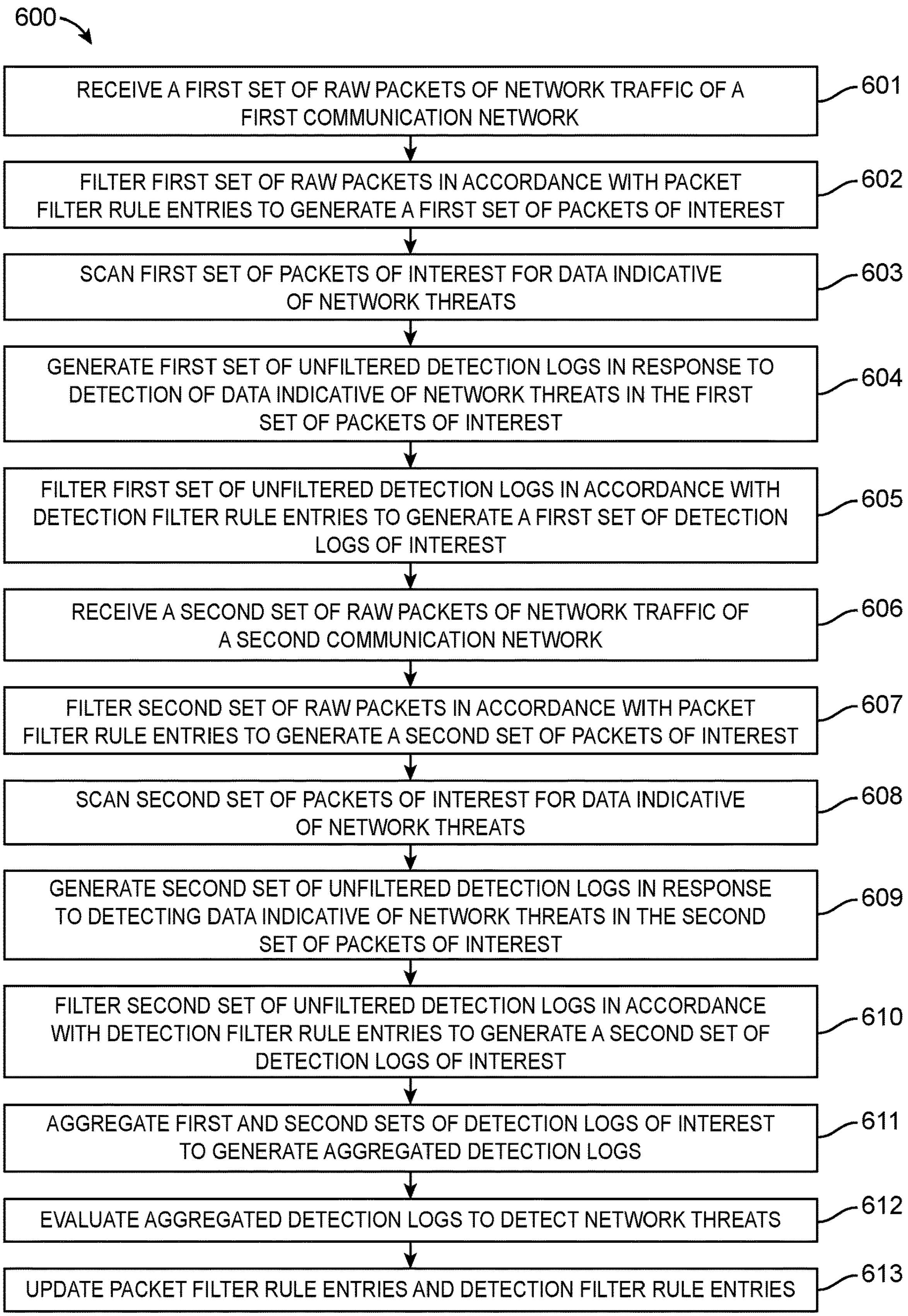
FIG. 11 shows a flow diagram of a method of detecting network threats in communication networks of a connected vehicle in accordance with an embodiment of the present invention.

FIG. 11 shows a flow diagram of a method 600 of detecting network threats in communication networks of a connected vehicle in accordance with an embodiment of the present invention. The method 600 may be implemented using components disclosed herein. As can be appreciated, other components may also be employed without detracting from the merits of the present invention.

In step 601, a first set of raw packets of network traffic of a first communication network of the connected vehicle being monitored for network threats is received.

In step 602, the first set of raw packets is filtered in accordance with one or more packet filter rule entries to generate a first set of packets of interest. The packet filter rule entries describe selected packets to be filtered out from the first set of raw packets.

In step 603, the first set of packets of interest is scanned for data indicative of network threats.

In step 604, a first set of unfiltered detection logs is generated in response to detecting data indicative of network threats in the first set of packets of interest.

In step 605, the first set of unfiltered detection logs is filtered in accordance with one or more detection filter rule entries to generate a first set of detection logs of interest. The detection filter rule entries describe selected detection logs to be filtered out from the first set of unfiltered detection logs.

In step 606, a second set of raw packets of network traffic of a second communication network of the connected vehicle being monitored for network threats is received.

In step 607, the second set of raw packets is filtered in accordance with one or more packet filter rule entries to generate a second set of packets of interest. The packet filter rule entries describe selected packets to be filtered out from the second set of raw packets.

In step 608, the second set of packets of interest is scanned for data indicative of network threats.

In step 609, a second set of unfiltered detection logs is generated in response to detecting data indicative of network threats in the second set of packets of interest.

In step 610, the second set of unfiltered detection logs is filtered in accordance with one or more detection filter rule entries to generate a second set of detection logs of interest. The detection filter rule entries describe selected detection logs to be filtered out from the second set of unfiltered detection logs.

In step 611, the first and second sets of detection logs of interest are aggregated to generate aggregated detection logs.

In step 612, the aggregated detection logs are evaluated to detect network threats. Remedial actions to be performed in response to detecting a network threat may include raising an alert (e.g., sending a text or email to a network administrator; displaying a warning message on a display screen), blocking the source of the network traffic, putting the packets in quarantine for additional investigation, etc.

In step 613, the packet filter rule entries and the detection filter rule entries are updated based on the evaluation of the aggregated detection logs. The packet filter rule entries are updated based on scanning of packets of interest for data indicative of network threats.

The method 600 may be performed a variety of ways depending on the deployment scenario of an IDPS. For example, the steps 601-611 may be performed on a single ECU of a plurality of ECUs of a connected vehicle. As another example, one or more steps of the method 600 may be performed in virtual machine environments. Yet another example, the steps of the method 600 may be distributed across several ECUs of the connected vehicle. The step 612 of evaluating the aggregated detection logs to detect network threats may be performed on the cloud, in a backend system that is external to the connected vehicle. Performing evaluation of the aggregated detection logs on the cloud addresses hardware limitations of the connected vehicle to effectively detect network threats onboard.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of detecting network threats in a connected vehicle, the method comprising:

in a first electronic control unit (ECU) of a plurality of ECUs of a connected vehicle:
- receiving raw packets of network traffic of a first communication network of the connected vehicle,
- filtering out selected packets from the raw packets of network traffic of the first communication network to generate a first set of packets of interest,
- scanning the first set of packets of interest for data indicative of network threats,
- generating a first set of unfiltered detection logs in response to detecting data indicative of network threats in the first set of packets of interest, and
- filtering out selected detection logs from the first set of unfiltered detection logs to generate a first set of detection logs of interest;

in a second ECU of the plurality of ECUs of the connected vehicle:
- receiving raw packets of network traffic of a second communication network of the connected vehicle,
- filtering out selected packets from the raw packets of network traffic of the second communication network to generate a second set of packets of interest,
- scanning the second set of packets of interest for data indicative of network threats,
- generating a second set of unfiltered detection logs in response to detecting data indicative of network threats in the second set of packets of interest, and
- filtering out selected detection logs from the second set of unfiltered detection logs to generate a second set of detection logs of interest;

in a third ECU of the plurality of ECUs of the connected vehicle: aggregating the first and second sets of detection logs of interest to generate aggregated detection logs; and in a backend system that is external to the connected vehicle: evaluating one or more detection logs of the aggregated detection logs to detect network threats in the first and second communication networks of the connected vehicle.

2. The method of claim 1, wherein the selected packets filtered out from the raw packets of network traffic of the first communication network are described by filter rule entries that are updated based at least on the scanning of the first set of packets of interest for data indicative of network threats in the first ECU.

3. The method of claim 1, wherein the selected packets filtered out from the raw packets of network traffic of the first communication network are described by filter rule entries that are updated based at least on the evaluation of the one or more detection logs of the aggregated detection logs in the backend system.

4. The method of claim 1, wherein the selected detection logs filtered out from the first set of unfiltered detection logs are described by detection filter rule entries.

5. The method of claim 4, wherein the detection filter rule entries are updated based at least on evaluation of the one or more detection logs of the aggregated detection logs in the backend system.

6. A system comprising:

a first electronic control unit (ECU) of a plurality of ECUs of a connected vehicle, the first ECU comprising a memory and at least one processor, the memory of the first ECU storing instructions that when executed by the at least one processor of the first ECU cause the first ECU to:

receive raw packets of network traffic of a first communication network of the connected vehicle;

filter out selected packets from the raw packets of network traffic of the first communication network to generate a first set of packets of interest;

scan the first set of packets of interest for data indicative of network threats;

generate a first set of unfiltered detection logs in response to detecting data indicative of network threats in the first set of packets of interest;

filter out selected detection logs from the first set of unfiltered detection logs to generate a first set of detection logs of interest;

receive raw packets of network traffic of a second communication network of the connected vehicle;

filter out selected packets from the raw packets of network traffic of the second communication network to generate a second set of packets of interest;

scan the second set of packets of interest for data indicative of network threats;

generate a second set of unfiltered detection logs in response to detecting data indicative of network threats in the second set of packets of interest;

filter out selected detection logs from the second set of unfiltered detection logs to generate a second set of detection logs of interest; and aggregate the first and second sets of detection logs of interest to generate a first set of aggregated detection logs; and a backend system comprising a memory and at least one processor, the memory of the backend system storing instructions that when executed by the at least one processor of the backend system cause the backend system to evaluate one or more detection logs of the first set of aggregated detection logs to detect network threats in the first and second communication networks of the connected vehicle.

7. The system of claim 6, further comprising:

a second ECU of the plurality of ECUs of the connected vehicle, the second ECU comprising a memory and at least one processor, the memory of the second ECU storing instructions that when executed by the at least one processor of the second ECU cause the second ECU to:

receive raw packets of network traffic of a third communication network of the connected vehicle;

filter out selected packets from the raw packets of network traffic of the third communication network to generate a third set of packets of interest;

scan the third set of packets of interest for data indicative of network threats;

generate a third set of unfiltered detection logs in response to detecting data indicative of network threats in the third set of packets of interest;

filter out selected detection logs from the third set of unfiltered detection logs to generate a third set of detection logs of interest;

receive raw packets of network traffic of a fourth communication network of the connected vehicle;

filter out selected packets from the raw packets of network traffic of the fourth communication network to generate a fourth set of packets of interest;

scan the fourth set of packets of interest for data indicative of network threats;

generate a fourth set of unfiltered detection logs in response to detecting data indicative of network threats in the fourth set of packets of interest;

filter out selected detection logs from the fourth set of unfiltered detection logs to generate a fourth set of detection logs of interest; and aggregate the third and fourth sets of detection logs of interest to generate a second set of aggregated detection logs, wherein the instructions stored in the memory of the backend system when executed by the at least one processor of the backend system cause the backend system to evaluate one or more detection logs of the second set of aggregated detection logs to detect network threats in the third and fourth communication networks of the connected vehicle.

8. The system of claim 6, wherein the instructions stored in the memory of the first ECU when executed by the at least one processor of the first ECU cause the first ECU to filter out selected packets from the raw packets of network traffic of the first communication network in accordance with a first set of packet filter rule entries that are updated based at least on a result of the scan of the first set of packets of interest for data indicative of network threats.

9. The system of claim 6, wherein the instructions stored in the memory of the first ECU when executed by the at least one processor of the first ECU cause the first ECU to filter out selected packets from the raw packets of network traffic of the first communication network in accordance with a first set of packet filter rule entries that are provided by the backend system.

10. A method of detecting network threats in a connected vehicle, the method comprising:

receiving raw packets of network traffic of a first communication network of a connected vehicle;

filtering out selected packets from the raw packets of network traffic of the first communication network to generate a first set of packets of interest;

scanning the first set of packets of interest for data indicative of network threats;

generating a first set of unfiltered detection logs in response to detecting data indicative of network threats in the first set of packets of interest;

filtering out selected detection logs from the first set of unfiltered detection logs to generate a first set of detection logs of interest;

receiving raw packets of network traffic of a second communication network of the connected vehicle;

filtering out selected packets from the raw packets of network traffic of the second communication network to generate a second set of packets of interest;

scanning the second set of packets of interest for data indicative of network threats;

generating a second set of unfiltered detection logs in response to detecting data indicative of network threats in the second set of packets of interest;

filtering out selected detection logs from the second set of unfiltered detection logs to generate a second set of detection logs of interest;

aggregating the first and second sets of detection logs of interest to generate aggregated detection logs; and evaluating one or more detection logs of the aggregated detection logs to detect network threats in the first and second communication networks of the connected vehicle.

11. The method of claim 10, wherein the selected packets filtered out from the raw packets of network traffic of the first communication network are described by filter rule entries that are updated based at least on the scanning of the first set of packets of interest for data indicative of network threats.

12. The method of claim 10, wherein the selected packets filtered out from the raw packets of network traffic of the first communication network are described by filter rule entries that are updated based at least on the evaluation of the one or more detection logs of the aggregated detection logs to detect network threats.

13. The method of claim 10, wherein the selected detection logs filtered out from the first set of unfiltered detection logs are described by detection filter rule entries.

14. The method of claim 13, wherein the detection filter rule entries are updated based at least on the evaluation of the one or more detection logs of the aggregated detection logs to detect network threats.

15. The method of claim 10, wherein the raw packets of network traffic of the first communication network are received in a first electronic control unit (ECU) of a plurality of ECUs of the connected vehicle, the first set of detection logs of interest is generated in the first ECU, the raw packets of network traffic of the second communication network are received in a second ECU of a plurality of ECUs of the connected vehicle, the second set of detection logs of interest is generated in the second ECU, and the aggregated detection logs are generated in a third ECU of the plurality of ECUs of the connected vehicle.

16. The method of claim 15, wherein the aggregated detection logs are evaluated in a backend system that is external to the connected vehicle.

17. The method of claim 10, wherein the raw packets of network traffic of the first communication network are received in a first virtual machine running in a first electronic control unit (ECU) of a plurality of ECUs of the connected vehicle, the first set of detection logs of interest is generated in the first virtual machine, the raw packets of network traffic of the second communication network are received in a second virtual machine running in the first ECU, the second set of detection logs of interest is generated in the second virtual machine, the first and second set of detection logs are aggregated in a third virtual machine running in the first ECU, and the aggregated detection logs are evaluated in a backend system that is external to the connected vehicle.

* * * * *